US011991196B2

(12) United States Patent
Khalil et al.

(10) Patent No.: US 11,991,196 B2
(45) Date of Patent: May 21, 2024

(54) ANOMALOUS USER ACCOUNT DETECTION SYSTEMS AND METHODS

(71) Applicant: Qatar Foundation for Education, Science and Community Development, Doha (QA)

(72) Inventors: Issa M. Khalil, Doha (QA); Ting Yu, Doha (QA); Eui J. Choo, Doha (QA); Lun-Pin Yuan, Doha (QA); Sencun Zhu, Doha (QA)

(73) Assignee: QATAR FOUNDATION FOR EDUCATION, SCIENCE AND COMMUNITY DEVELOPMENT, Doha (QA)

( * ) Notice: Subject to any disclaimer, the term of this patent is extended or adjusted under 35 U.S.C. 154(b) by 308 days.

(21) Appl. No.: 17/685,687

(22) Filed: Mar. 3, 2022

(65) Prior Publication Data

US 2022/0286472 A1 Sep. 8, 2022

Related U.S. Application Data

(60) Provisional application No. 63/156,595, filed on Mar. 4, 2021.

(51) Int. Cl.
*H04L 9/40* (2022.01)
(52) U.S. Cl.
CPC ...... *H04L 63/1425* (2013.01); *H04L 63/0876* (2013.01)
(58) Field of Classification Search
CPC .......... H04L 63/1425; H04L 63/0876
(Continued)

(56) References Cited

U.S. PATENT DOCUMENTS 10,367,841 B2   7/2019 Arnaldo et al.
10,419,458 B2   9/2019 Moscovici et al.
(Continued)

FOREIGN PATENT DOCUMENTS

EP   1887754 A1 *  2/2008   .......... G06F 21/552
GB   2602967 A *  7/2022   .......... G06F 21/552
WO   WO-2022115623 A1 *  6/2022   ............. G06F 9/451

OTHER PUBLICATIONS

Viswanathan et al., "Ranking anomalies in data centers," 2012 IEEE Network Operations and Management Symposium, Maui, HI, USA, 2012, pp. 79-87, doi: 10.1109/NOMS.2012.6211885. (Year: 2012).*
(Continued)

*Primary Examiner* — Peter C Shaw
(74) *Attorney, Agent, or Firm* — K&L Gates LLP

(57) ABSTRACT

Autoencoder-based anomaly detection methods have been used in identifying anomalous users from large-scale enterprise logs with the assumption that adversarial activities do not follow past habitual patterns. Most existing approaches typically build models by reconstructing single-day and individual-user behaviors. However, without capturing long-term signals and group-correlation signals, the models cannot identify low-signal yet long-lasting threats, and will incorrectly report many normal users as anomalies on busy days, which, in turn, leads to a high false positive rate. A method is provided based on compound behavior, which takes into consideration long-term patterns and group behaviors. The provided method leverages a novel behavior representation and an ensemble of deep autoencoders and produces an ordered investigation list.

19 Claims, 8 Drawing Sheets

(58) Field of Classification Search
USPC .......................................................... 726/23
See application file for complete search history.

(56) References Cited

U.S. PATENT DOCUMENTS

| | | | |
|---|---|---|---|
| 10,652,257 B1 | 5/2020 | Shah et al. | |
| 10,848,519 B2 | 11/2020 | Howard et al. | |
| 11,611,532 B1* | 3/2023 | Haefner | H04L 63/1425 |
| 2010/0031358 A1* | 2/2010 | Elovici | H04L 63/1441 |
| | | | 714/48 |
| 2012/0137367 A1* | 5/2012 | Dupont | G06F 21/00 |
| | | | 726/25 |
| 2015/0229662 A1* | 8/2015 | Hitt | H04L 63/1425 |
| | | | 726/23 |
| 2016/0156653 A1 | 6/2016 | Zhang et al. | |
| 2018/0248904 A1 | 8/2018 | Villella et al. | |
| 2018/0259661 A1* | 9/2018 | Harris | E21B 49/00 |
| 2019/0166141 A1 | 5/2019 | Xu et al. | |
| 2021/0048994 A1* | 2/2021 | Yu | G06F 21/57 |
| 2022/0171995 A1* | 6/2022 | Balasubramanian | G06F 18/2155 |
| 2022/0172100 A1* | 6/2022 | Balasubramanian | G06V 10/776 |
| 2022/0172342 A1* | 6/2022 | Zepeda Salvatierra | G06V 30/19147 |
| 2023/0096895 A1* | 3/2023 | Stokes, III | G06F 18/214 |
| | | | 726/22 |

OTHER PUBLICATIONS

Camino et al., "Finding Suspicious Activities in Financial Transactions and Distributed Ledgers," 2017 IEEE International Conference on Data Mining Workshops (ICDMW), New Orleans, LA, USA, 2017, pp. 787-796, doi: 10.1109/ICDMW.2017.109. (Year: 2017).*

Yuan et al., "Time-Window Based Group-Behavior Supported Method for Accurate Detection of Anomalous Users," 2021 51st Annual IEEE/IFIP International Conference on Dependable Systems and Networks (DSN), Taipei, Taiwan, 2021, pp. 250-262, doi: 10.1109/DSN48987.2021.00038. (Year: 2021).*

Zohrevand et al., "Should I Raise The Red Flag? A comprehensive survey of anomaly scoring methods toward mitigating false alarms," arXiv:1904.06646, Apr. 14, 2019. (Year: 2019).*

Lee et al., "Gen2Out: Detecting and Ranking Generalized Anomalies," 2021 IEEE International Conference on Big Data (Big Data), Orlando, FL, USA, 2021, pp. 801-811, doi: 10.1109/BigData52589.2021.9671550. (Year: 2021).*

Yuan, et al.; "Time-Window Group Correlation Support vs. Individual Features: A Detection of Abnormal Users"; Dec. 27, 2020; (13 pages).

Brael, et al.; "Anomaly Detection in Univariate Time-Series: A Survey On the State-Of-The- Art"; Apr. 2, 2020; (39 pages).

* cited by examiner

|  | Timeframe 1 | Timeframe 1 | Timeframe 2 | Timeframe 2 |
|---|---|---|---|---|
| | Timeframe 1 Working Hours | Timeframe 1 Off Hours | Timeframe 2 Working Hours | Timeframe 2 Off Hours |
| Activity 1 | User ID Behavior during Working Hours | User ID Behavior during Off Hours | User ID Behavior during Working Hours | User ID Behavior during Off Hours |
| ......... | | | | |
| Activity N | User ID Behavior during Working Hours | User ID Behavior during Off Hours | User ID Behavior during Working Hours | User ID Behavior during Off Hours |
| Activity 1 | Group Behavior during Working Hours | Group Behavior during Off Hours | Group Behavior during Working Hours | Group Behavior during Off Hours |
| ......... | | | | |
| Activity N | Group Behavior during Working Hours | Group Behavior during Off Hours | Group Behavior during Working Hours | Group Behavior during Off Hours |
| | Day 1 ......... Day D | | Day 1 ......... Day D | |

ANOMALOUS USER ACCOUNT DETECTION SYSTEMS AND METHODS

PRIORITY CLAIM

The present application claims priority to and the benefit of U.S. Provisional Patent Application No. 63/156,595, filed on Mar. 4, 2021, the entirety of which is incorporated herein by reference.

BACKGROUND

Emerging cyber threats such as data breaches, data exfiltration, botnets, and ransomware have caused serious concerns in the security of enterprise infrastructures. The root cause of a cyber-threat could be a disgruntled insider or a newly-developed malware. Emerging cyber threats have also been increasingly difficult to identify by signature-based detection methods because more and more evasive techniques are available to adversaries. To help identify emerging cyber-threats before they can cause greater damage, anomaly detection from user behaviors can be used, which enables security analysts to find suspicious activities that could be the aftermath of cyber-threats (e.g., cyberattacks, insider threats, a data breach, data exfiltration, botnets, and ransomware). Adversarial activities often manifest themselves in abnormal behavioral changes compared to past habitual patterns.

Autoencoders are one of the most well-known anomaly detection techniques. They are attractive to security analysts because of their robustness to domain knowledge. An autoencoder-based anomaly detection model only learns how to reconstruct normal data; hence, in events of poor reconstruction, the input data is highly likely to be abnormal. Detailed domain knowledge is no longer required, because the complex correlation among different activities is captured by learning the normal distribution from normal activities. Furthermore, an autoencoder learns features from unlabeled data in an unsupervised manner, where human interference is reduced.

Autoencoders and other typical anomaly detection methods, however, often suffer from an overwhelming number of false positives. This is at least in part because typical anomaly detection methods focus on building a model based on single-day individual-user behaviors, which has several drawbacks. First, cyber threats often do not cause a significant impact immediately on a user's behavioral patterns, but rather progressively cause low, yet long-lasting signals. For example, a disgruntled employee may stealthily leak sensitive data piece-by-piece over time.

Additionally, the user's normal behavior can differ from time to time, depending on the user's regular daily behavior patterns. For example, users may have more business hours or working days than they do non-business hours or holidays. Accordingly, typical anomaly detection methods based on single-day behavior may wrongly report many normal users as anomalies due to a significant change in activity in a short amount of time on a particular day, such as a particularly busy workday.

Additionally, by only considering individual-user behavior, typical anomaly detection methods may generate false positives on occasions when many users have a common burst of events. For example, such a common burst of events may be due to an environmental change, such as common traffic bursts occurring among many users when there is a new service or a service outage.

Further, typical anomaly detection methods often only output anomaly labels (i.e., either normal or abnormal). However, security analysts can be overwhelmed by heavy investigation workload if a model provides only anomaly labels.

Accordingly, a need exists for systems and methods that solve at least some of the above drawbacks of typical anomaly detection from user behaviors.

SUMMARY

The present application relates generally to anomaly detection. More specifically, the present application provides an anomaly detection method based on compound behavior, in which a compound behavior includes individual-user behaviors and group behaviors across multiple time-frames and a time window in days. An anomaly detection is applied to the compound behavior with deep fully-connected autoencoders. An example system workflow includes: (1) deriving compound behavioral deviation matrices from organizational audit logs, (2) for each user, calculating anomaly scores in different behavioral aspects using an ensemble of autoencoders, and (3) having anomaly scores, producing an ordered list of users that need further investigation.

In an example, a system for detecting anomalous cyber activity includes a memory in communication with a processor. The processor receives information on each of a plurality of cyber activities for each of a first plurality of user IDs; determines, for each of the plurality of cyber activities of each of the first plurality of user IDs, a first deviation between the received information on a respective cyber activity for a respective user ID and previously stored information on the respective cyber activity for the respective user ID; determines, for each of the plurality of cyber activities of each of the first plurality of user IDs, a second deviation between the received information on the respective cyber activity for the respective user ID and previously stored group information on the respective cyber activity for a group including a second plurality of user IDs; determines, using at least one autoencoder, an anomaly score for each of the plurality of cyber activities of each of the first plurality of user IDs based on the determined first and second deviations for a respective cyber activity of a respective user ID; and generates an ordered list of user IDs from the first plurality of user IDs based on the respective anomaly scores of each of the first plurality of user IDs such that the user ID with the most anomalous cyber activities is listed first in the ordered list.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

FIG. 3 illustrates an example compound behavioral deviation matrix, according to an aspect of the present disclosure.

DETAILED DESCRIPTION

Figure 1:
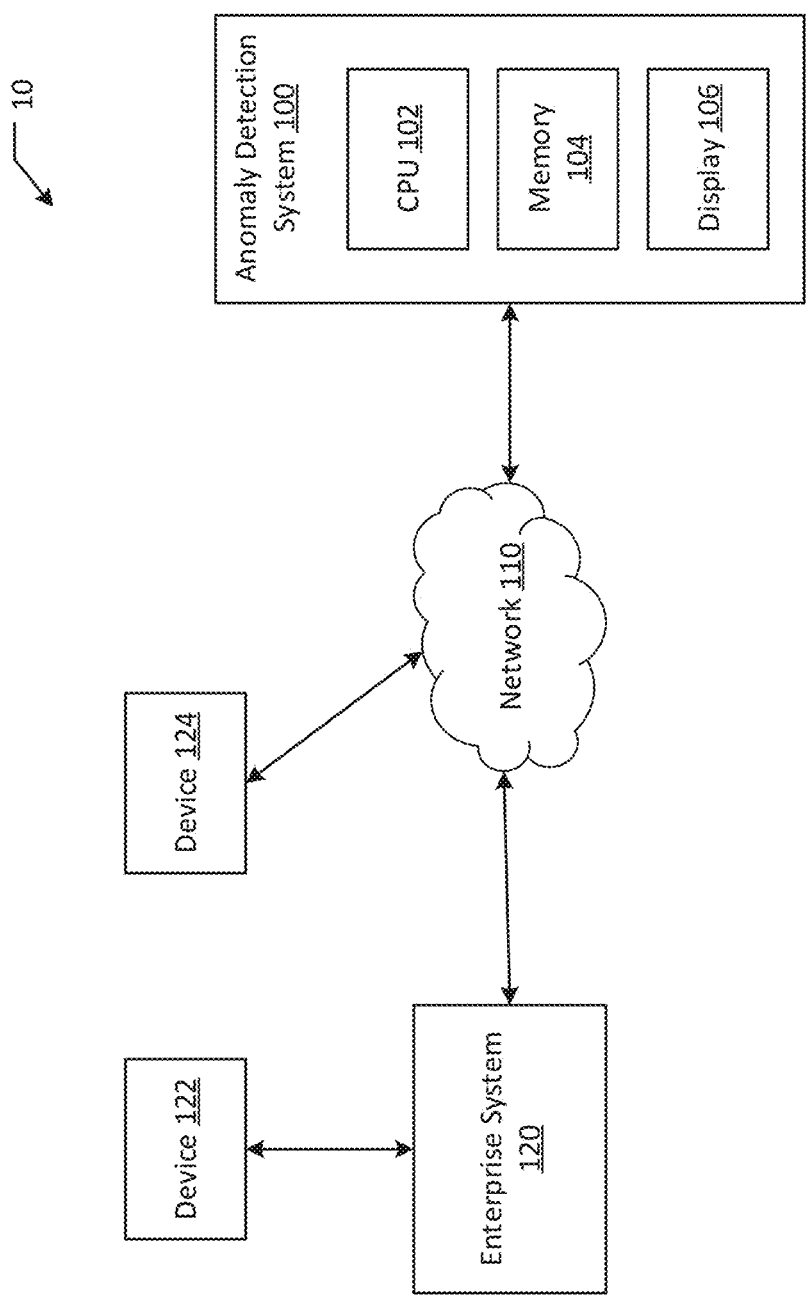
FIG. 1 illustrates an example system for detecting anomalous cyber activity, according to an aspect of the present disclosure.

The present application provides new and innovative anomaly detection systems and methods that utilize compound behavioral deviation matrix in order to detect anomalies through individual-user behaviors and group behaviors across multiple time-frames and a time window in days. Anomaly detection upon user behaviors enables security analysts to find suspicious activities caused by cyber threats including insider threats and cyber attacks. An anomaly detection problem can be described as follows: given a set of per-user activities, provide an investigation list of usernames that need to be orderly investigated. At the top of such a list are the most abnormal users. Autoencoders have been widely used in solving such an anomaly detection problem, as it is capable of learning what is normal in order to find what is abnormal. At least some typical autoencoders reconstruct single-day individual-user behaviors. However, single-day user-behavior reconstruction has drawbacks for identifying cyber threats. The inventors have found that examining long-term signals and group-correlation signals reduces the false-positive rate as compared to examining only individual behaviors over a single day for at least the following reasons.

First, certain cyber compromise scenarios do not cause immediate behavioral deviation, but progressively cause small long-lasting behavioral deviation in different behavioral aspects across multiple days. Take Zeus botnet malware as an example, once triggered, it modifies registry values (e.g., deviation in system configuration). After a few days, it communicates with a command and control server and acts maliciously (e.g., deviation in network traffic). Since these two behavioral deviations occur on different days, only models that examine long-term behaviors can identify such an anomaly. In contrast, single-day user-behavior reconstruction may fail to identify the threats, and it may also wrongly give high anomaly scores to busy days (e.g., working Mondays and make-up days). The provided system Second, the granularity of feature measurements is also an important factor in building profiles to accurately capture normal user behavior. Concretely, users often tend to have more human-initiated activities (e.g., sending emails, browsing web pages, writing documents) during working hours, but more computer-initiated activities (e.g., system updates, system backups, network retries due to no password input) during off, non-working hours. The provided system therefore captures behaviors over multiple time-frames (e.g., working hours and off hours) within each day of the measurement window.

Third, there often exists certain behavioral correlation between an individual user and its group due to environmental change or locale change. Take environmental change as an example, when there is a new service or service outage, one can expect correlated unrecognized traffics or correlated retry traffics, respectively. Take locale change as another example, one can expect more human-initiated activities during working hours on working days, as opposed to during off hours or holidays. As such, the inventors have found that a greater behavioral correlation a user has with the group, the less likely the user is compromised. A model without incorporating the group behavior may not only be ineffective in identifying anomalies, but also wrongly give high anomaly scores to individual users in events of environmental or locale changes.

Each compound behavioral deviation matrix of the provided system encloses individual behaviors and group behaviors across multiple timeframes in a time window (e.g., working hours versus off hours across multiple days) that thereby make up compound behaviors. In an example, the provided system may retrieve audit logs from an enterprise over a network and generate compound behavioral deviation matrices from the retrieved audit logs. Anomaly detection models may then be applied to the compound behaviors. In at least some aspects, the anomaly detection models may be implemented with an ensemble of deep fully connected autoencoders. By examining long-term behavior signals (e.g., over a time window of more than a single day), the provided method may identify low-signal yet long-lasting threats. By examining behavioral group-correlation, the provided method may determine that a common behavioral burst is indeed normal, assuming the more behavioral correlation a user has with the group, the less likely the user is abnormal, and therefore avoid obvious false positives that may result from unusual yet common activities of users. As such, the consideration of long-term and group behaviors helps the provided method produce a lower false positive rate than typical anomaly detection methods.

FIG. 1 illustrates an example system 10. The example system 10 may include an anomaly detection system 100 that detects anomalous user activity on an enterprise system 120 in order to help prevent or limit activity harmful to the enterprise system 120 or the owner of the enterprise system 120. For example, the anomaly detection system 100 may derive compound behavioral deviation matrices from enterprise audit logs. Then, for each user, the provided anomaly detection system 100 may calculate anomaly scores in different behavioral aspects for each user using an ensemble of autoencoders. Having the calculated anomaly scores, the anomaly detection system 100 may produce an ordered list of users that need further investigation. The anomaly detection system 100 may include a memory 104 in communication with a processor. The processor may be a CPU 102, an ASIC, or any other similar device. In at least some aspects, the anomaly detection system 100 may include a display 106. The display 106 may be any suitable display for displaying electronic information, and in some aspects, may be a touchscreen. In other examples, the components of the anomaly detection system 100 may be combined, rearranged, removed, or provided on a separate device or server.

In some aspects, the anomaly detection system 100 may communicate with the enterprise system 120 over a network 110. The network 110 can include, for example, the Internet or some other data network, including, but not limited to, any suitable wide area network or local area network. The enterprise system 120 may be computing infrastructure of a company, organization, etc. For example, the enterprise system 120 may be the hardware, software, network resources and services required for the existence, operation and management of a company's information technology environment. The company's employees, each identified by a user ID, may access this example enterprise system 120 on a daily basis when performing their work-related duties (e.g., draft, save, and access electronic files, send emails and electronic files, access domain addresses on a web browser, communicate with others internally or externally, etc.). For example, an employee may access the enterprise system 120 via a device 122 locally through a wired connection. In another example, an employee may wirelessly, or remotely, access the enterprise system 120 via a device 124 through the network 110. The device 122 and/or device 124 may be a laptop, desktop computer, tablet, smartphone, etc.

Figure 2:
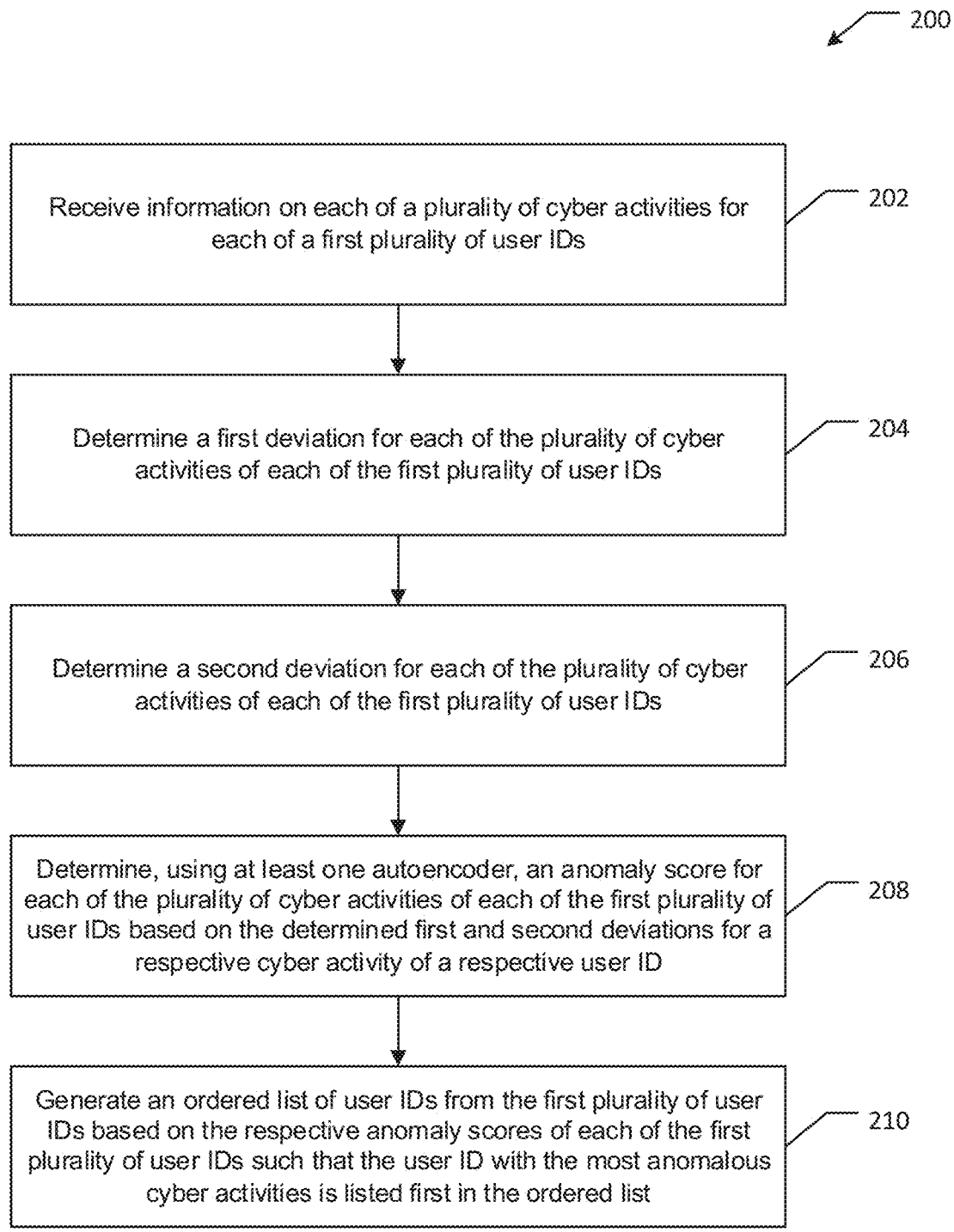
FIG. 2 illustrates a flowchart of an example method for detecting anomalous cyber activity, according to an aspect of the present disclosure.

FIG. 2 shows a flow chart of an example method 200 for detecting anomalous cyber activity of users. Although the example method 200 is described with reference to the flowchart illustrated in FIG. 2, it will be appreciated that many other methods of performing the acts associated with the method 200 may be used. For example, the order of some of the blocks may be changed, certain blocks may be combined with other blocks, and some of the blocks described are optional. The method 200 may be performed by processing logic that may comprise hardware (circuitry, dedicated logic, etc.), software, or a combination of both. For example, the memory 104 may store processing logic that enables the CPU 102 to execute the method 200.

In various aspects, the example method 200 may begin by receiving information on each of multiple cyber activities (e.g., behavioral aspects) for each user ID of a first set of user IDs (block 202). For example, the anomaly detection system 100 may receive organizational audit logs from the enterprise system 120. The organizational audit logs may include each of the cyber activities performed on the enterprise system 120 by the various users, identified by user IDs, of the enterprise system 120. In various aspects, these cyber activities may include at least one of the usage of external storage devices (e.g., a flash/USB drive), accessing files, accessing web domains, and configuration changes, though may include other suitable cyber activities. For example, each log entry for the usage of external storage devices in an audit log may include a user ID, an activity (e.g., connect or disconnect), and a host ID to where the external storage device was connected. Information received on the usage of external storage devices, in this example, may include: (1) a quantity of connections of an external storage device by a respective user ID to a device (e.g., a laptop of the user associated with the user ID) in communication with the enterprise system 120, which is in communication with the anomaly detection system 100 (e.g., the processor), and (2) a quantity of connections of an external storage device by the respective user ID to a device (e.g., a server or other computing device that is not the laptop of the user associated with the user ID) that the respective user ID had never connected to before.

In another example, each log entry for file accesses in an audit log may include a user ID, an activity (e.g., open, copy, write), a file ID, and a dataflow direction. Information received on accessing files, in this example, may include: (1) a quantity of files locally opened by the respective user ID that the respective user ID had never locally opened before, (2) a quantity of files remotely opened by the respective user ID that the respective user ID had never remotely opened before, (3) a quantity of files written locally by the respective user ID that the respective user ID had never written locally before, (4) a quantity of files written remotely by the respective user ID that the respective user ID had never written remotely before, (5) a quantity of local files copied to a remote device that the respective user ID had never copied to a remote device before, and (6) a quantity of remote files copied to a local device that the respective user ID had never copied to a local device before. As used herein, a file is locally opened, written, or copied if the computing device used to open, write, or copy the file is locally connected to the enterprise system 120, such as through Ethernet. Conversely, a file is remotely opened, written, or copied if the computing device used to open, write, or copy the file is remotely connected to the enterprise system 120, such as through a VPN.

In another example, each log entry for web domain accesses in an audit log may include a user ID, an activity (e.g., visit, download, upload), a domain, and a file type (e.g., .doc, .docx, .exe, .jpg, .pdf, .txt, .zip, etc.) that was uploaded or downloaded. Information received on accessing web domains, in this example, may include a quantity of file uploads to a domain address that the respective user ID had never before uploaded to the domain address. For instance, information may include: (1) a quantity of document file uploads to a domain address that the respective user ID had never before uploaded to the domain address, (2) a quantity of .exe file uploads to a domain address that the respective user ID had never before uploaded to the domain address, (3) a quantity of .jpg file uploads to a domain address that the respective user ID had never before uploaded to the domain address, (4) a quantity of .pdf file uploads to a domain address that the respective user ID had never before uploaded to the domain address, (5) a quantity of .txt file uploads to a domain address that the respective user ID had never before uploaded to the domain address, (6) a quantity of .zip file uploads to a domain address that the respective user ID had never before uploaded to the domain address, and (7) a quantity of new http requests that the respective user ID had never before requested.

In another example, each log entry for configuration changes in an audit log may include a user ID, an activity (e.g., modification), and a change made. Information received on configuration changes, in this example, may include: (1) a registry modified by the respective user ID, (2) a password modified by the respective user ID, and (3) a group modified by the respective user ID.

The information on each of the multiple cyber activities (e.g., behavioral aspects) for each user ID of the first set of user ID may be captured in a compound behavioral deviation matrix which encloses deviation of individual user behavior and group behavior across multiple time-frames and a multi-day time window. FIG. 3 illustrates an example compound behavioral deviation matrix 300. Each feature (e.g., activity) in user behavior represents a normalized characteristic of an aggregated behavior (during the specific time-frame on specific day as indicated by the columns). As shown, the compound behavioral deviation matrix 300 captures individual user ID behavior during a first timeframe (e.g., working hours) over a series of days and during a second timeframe (e.g., off hours) over the series of days, as well as group behavior during the first timeframe over the series of days and during the second timeframe over the series of days.

Returning to FIG. 2, in at least some aspects, the example method 200 may include determining a first deviation (e.g., an individual-based deviation) for each of the user IDs in the first set of user IDs (block 204). The first, or individual-based, deviation is one component of a compound behavioral deviation matrix that captures a deviation of a particular user's cyber activities from the user's previous cyber activities over multiple timeframes and a multi-day time window. In one particular example, a variance of a particular user ID's behavior for a particular cyber activity compared to the user ID's previous behavior is determined according to Equation 1 below. In Equation 1, an individual-based variance $\delta_{f,t,d}$ is determined for a respective user ID of a cyber activity f, in a timeframe t, on a day d. The term $m_{f,t,d}$ captures numeric measurements for the respective user ID of the cyber activity f, in the timeframe t, on the day d. The term $\vec{h}_{f,t,d}$ is a vector of the previously stored information for the respective user ID of the cyber activity f in the timeframe t, on the day d. Equation 1 calls for determining a mean (e.g., average) and standard deviation (e.g., std) of $\vec{h}_{f,t,d}$. In one example, $\vec{h}_{f,t,d}$ may be determined according to Equation 2 below in which $\omega$ is a window size in days and $\omega$-1 is captures days before day d. In one example, std($\vec{h}_{f,t,d}$) may be determined according to Equation 3 below such that std($\vec{h}_{f,t,d}$) is set to e if it is less than e to avoid divide-by-zero exception). In at least some aspects, an individual-based sigma $\sigma_{f,t,d}$ may be determined from the individual-based variance $\delta_{f,t,d}$ according to Equation 4 below. In Equation 4, the individual-based variance $\delta_{f,t,d}$ is bounded since it is equivalently anomalous when $|\delta_{f,t,d}| \geq \Delta$. Stated differently, variances larger than $\Delta=3$ are equivalently very abnormal, assuming the numeric measurements follow Gaussian distribution. Note that, in events when users slowly shift their normal behavioral patterns over time, their compound behavioral deviation matrices will not show increasing deviation over time, as the previously stored information $\vec{h}_{f,t,d}$ (from which deviations are derived) slides through time and will always cover the recent shift.

$$\delta_{f,t,d} = \frac{m_{f,t,d} - \text{mean}(\vec{h}_{f,t,d})}{std(\vec{h}_{f,t,d})} \tag{1}$$

$$\vec{h}_{f,t,d} = [m_{f,t,i} \mid i: d - \omega + 1 \leq i < d] \tag{2}$$

$$std(\vec{h}_{f,t,d}) = \begin{cases} \epsilon, & \text{if } std(\vec{h}_{f,t,d}) < \epsilon \\ std(\vec{h}_{f,t,d}), & \text{otherwise} \end{cases} \tag{3}$$

$$\sigma_{f,t,d} = \begin{cases} \Delta, & \text{if } \delta_{f,t,d} \geq \Delta \\ -\Delta, & \text{if } \delta_{f,t,d} \leq -\Delta \\ \delta_{f,t,d}, & \text{otherwise} \end{cases} \tag{4}$$

In various aspects, a timeframe t may be a period of hours within a single day or across adjacent days. For example, a first timeframe may capture typical working hours for employees of a company (e.g., 8 am-5 pm, 9 am-6 pm, 7 am-6 pm, etc.) while a second timeframe may capture typical non-working, or off, hours for employees of the company (e.g., 5:01 pm-7:59 am, 6:01 pm-8:59 am, 6:01 pm-6:59 am, etc.). In other examples, there may be three or more separate timeframes, such as to capture normal working hours, semi-normal working hours, and normal non-working hours. In some aspects, the timeframes might not cover an entire 24-hour period. A day d may be a single 24-hour period measured from a suitable starting point (e.g., 12 am-11:59 pm, 8 am-7:59 am, etc.). The method 200 accordingly can include determining a deviation from information across multiple timeframes over multiple days within a time window. For example, the method 200 can include determining a deviation from information on a user's cyber activity between 8 am and 6 pm on each of five consecutive days and on the user's activity between 6:01 pm and 7:59 am on each of those five consecutive days.

An individual-based sigma $\sigma_{f,t,d}$ may be determined for each cyber activity of a particular user ID. In one aspect, the individual-based deviation D1 of the particular user ID may then be determined by a summation of each individual-based sigma $\sigma_{f,t,d}$ for the particular individual ID. In other aspects, weights may be applied to the different cyber activities during summation to determine the individual-based deviation since different cyber activities can have different importance in capturing user behavior. Stated differently, a weight may be applied to the sigma of $\sigma_{f,t,d}$ of each cyber activity according to Equation 5 below. For example, frequent and chaotic file opening activities are often less critical than rarer file writing activities. Because the anomaly scores described below are essentially the reconstruction errors of features (e.g., cyber activities), applying weights to features can scale-down unimportant features and thus the partial errors introduced by unimportant features. Consequently, it enables the anomaly detection system 100 to focus only on reconstructing important features while being more resilient to noise introduced by unimportant features. In some aspects, weights may be applied to features based on modified Term Frequency-Inverse Document Frequency (TF-IDF) measurements, as described below. For example, each cyber activity (e.g., each sigma of $\sigma_{f,t,d}$) may have a weight $w_{f,t,d}$ applied that is defined by Equation 6 below.

$$D1 = \omega_{1,t,d}\sigma_{1,t,d} + \omega_{2,t,d}\sigma_{2,t,d} \ldots + \omega_{f,t,d}\sigma_{f,t,d} \tag{5}$$

$$\omega_{f,t,d} = \frac{1}{\log_2\left(\max\left(std(\vec{h}_{f,t,d}), 2\right)\right)} \tag{6}$$

Equation 6 is based on the log-normalized Term Frequency (TF) weight, which is defined by $TF_x = \log(1+\text{frequency of a term x})$. Stated differently, the less the frequency, the less information a term x could provide. Yet, unlike terms, the higher the standard deviation (e.g., more chaotic), the less information a cyber activity f could provide. As such, in this example, TF-IDF is modified such that the equation $TF_x$ is inversed and standard deviation is substituted for frequency, so that the weights are lower for chaotic features but higher for consistent features by design. However, it cannot be infinitely high for constantly static features with very small std ($\vec{h}_{f,t,d}$), or otherwise the anomaly detection system 100 would be overly sensitive to small changes of static features. Therefore, a minimum value of two is given to the logarithm function, and the base is changed to two so that the maximum value of weights is bounded to one. Stated differently, activities with small standard deviation less than two shall have equal weights of value one.

In at least some aspects, the example method 200 may include determining a second deviation (e.g., a group-based deviation) for each of the cyber activities of each of the user IDs in the first set of user IDs (block 206). The second, or group-based, deviation is one component of a compound behavioral deviation matrix that captures a deviation of a particular user's cyber activities from a group's cyber activities over multiple timeframes and a multi-day time window. The group includes a second set of user IDs. In some aspects, the second set of user IDs may be the same as the first set of user IDs for which information was received in block 202. For example, the group-based deviation may capture a deviation of a particular employee's cyber activities from the cyber activities of the rest of the current employees in the company. In other aspects, the second set of user IDs may be different than the first set of user IDs for which information was received in block 202. For example, the group-based deviation may capture a deviation of a particular employee's cyber activities from the cyber activities of the rest of the current employees, as well as former employees, in the company. The enterprise detection system 200 would no longer be collecting audit log information on cyber activities of former employees, and therefore the anomaly detection system 100 would not receive such information at block 202, though former employees' cyber activities could be part of the group baseline from which the particular user's deviation is determined.

In one particular example, a variance of a particular user's behavior for a particular cyber activity compared to group behavior is determined according to Equation 7 below. The terms described previously for Equations 1 to 4 will not be described here again. The term $\vec{g}_{f,t,d}$ is a vector of the previously stored information for the group of the cyber activity f, in the timeframe t, on the day d. The previously stored information on a group for a particular cyber activity may be an average of the information on each user ID in the group for that particular cyber activity. In various aspects, $\vec{g}_{f,t,d}$ may be determined the same as $\vec{h}_{f,t,d}$ described above (e.g., Equations 2 and 3), except that $\vec{g}_{f,t,d}$ is for group-based information rather than individual-based information. In at least some aspects, a group-based sigma $\sigma_{f,t,d}$ may be determined from the group-based variance $\delta_{f,t,d}$ in the same way as described above for the individual-based sigma $\sigma_{f,t,d}$ (e.g., Equation 4). The value of A may be the same for the group-based sigma $\sigma_{f,t,d}$ as the individual-based sigma $\sigma_{f,t,d}$ or may be different. In some aspects, weights may be applied to the different cyber activities in the group-based deviation (e.g., Equation 5 substituting $\vec{g}_{f,t,d}$ for $\vec{h}_{f,t,d}$).

$$\delta_{f,t,d} = \frac{m_{f,t,d} - \text{mean}(\vec{g}_{f,t,d})}{\text{std}(\vec{g}_{f,t,d})} \quad (7)$$

A group-based sigma $\sigma_{f,t,d}$ may be determined for each cyber activity of a particular user ID. In one aspect, the group-based deviation D2 of the particular user ID may then be determined by a summation of each group-based sigma $\sigma_{f,t,d}$ for the particular individual ID. In other aspects, weights may be applied to the different cyber activities during summation to determine the group-based deviation since different cyber activities can have different importance in capturing user behavior. Stated differently, a respective weight (e.g., a weight $w_{f,t,d}$ of Equation 6) may be applied to the sigma $\sigma_{f,t,d}$ of each cyber activity (e.g., Equation 5).

The example method 200 may then include determining, using at least one autoencoder, an anomaly score for each of the cyber activities of each of the first set of user IDs based on the determined first and second deviations for a respective cyber activity of a respective user ID (block 208). Stated differently, an anomaly score for a particular cyber activity of a particular user ID may be determined based on the first and second deviations for that particular cyber activity of the particular user ID. In various aspects, anomaly scores may be determined using an ensemble of autoencoders, each of which identifies behavioral anomalies in terms of a designated cyber activity category. For example, one autoencoder may determine an anomaly score for all file access activities whereas a second autoencoder may determine an anomaly score for all web domain access activities.

Figure 4:
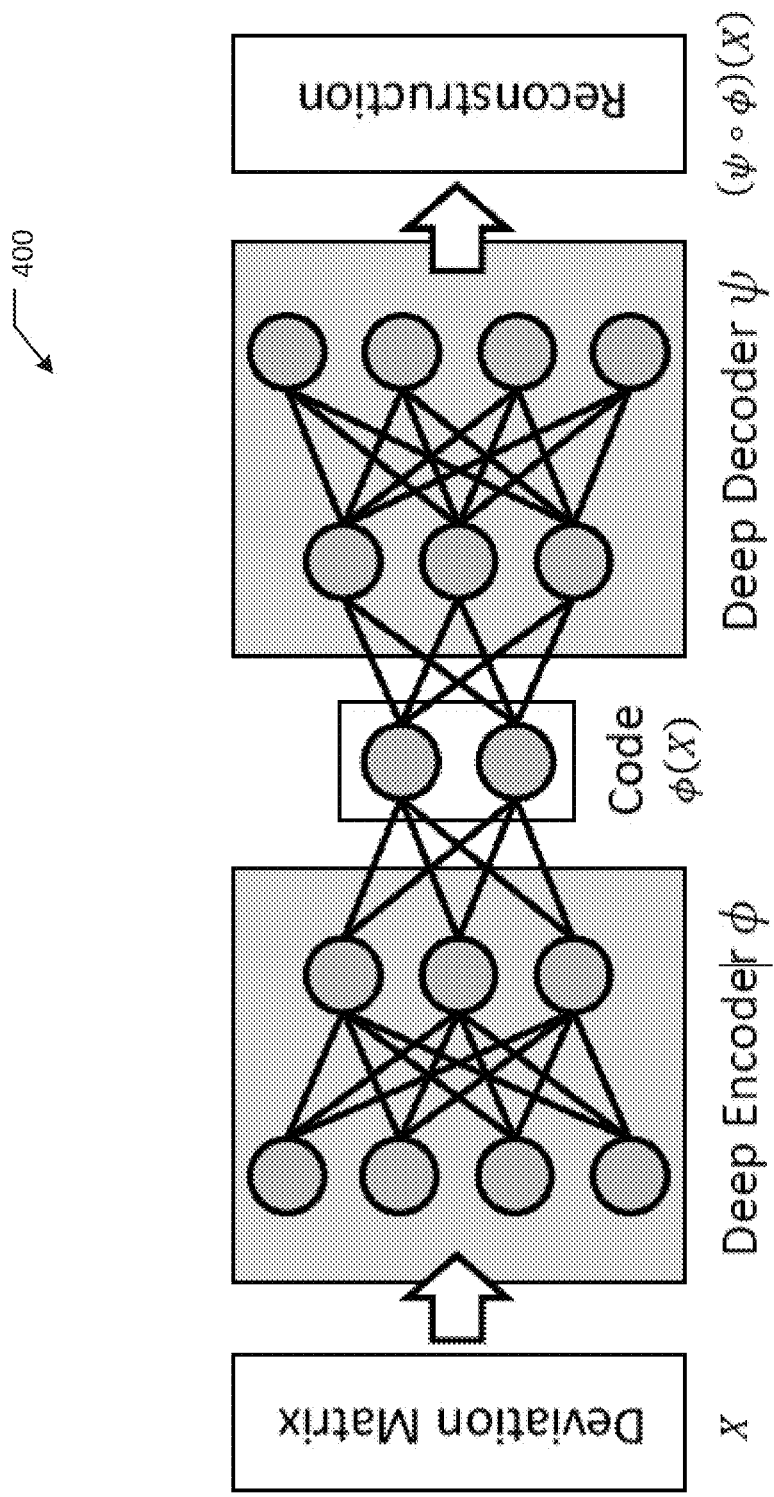
FIG. 4 illustrates an example of a deep fully-connected autoencoder, according to an aspect of the present disclosure.

As is known in the art, an autoencoder is a type of artificial neural network used to learn efficient codings of unlabeled data (unsupervised learning). An autoencoder has two main parts: an encoder that maps the input into the code, and a decoder that maps the code to a reconstruction of the input. In at least some aspects, each of the at least one autoencoder is a deep fully-connected autoencoder. Trained with only normal matrices, an autoencoder is able to reconstruct only normal matrices with minimal reconstruction errors. In events of high reconstruction errors, the abnormal matrices are likely aftermath of compromised users or unusual legitimate user activity. FIG. 4 illustrates an example of a deep fully-connected autoencoder 400. It at least some aspects, the deep fully-connected autoencoder 400 may be trained by minimizing $|\varphi, \psi = \arg\min \varphi, \psi \| X - (\psi \circ \varphi)(X) \|$, where $\varphi$ is a multi-layer fully-connected encoder, $\psi$ is a multi-layer fully-connected decoder, X is the input matrix, and $(\psi \circ \varphi)(X)$ is the reconstructed matrix. In between, the code $\varphi(X)$ encloses the characteristics of the input matrix. In some aspects, the layers of the encoders may be stacked, which can help with reducing reconstruction error between the input and the output.

Returning to FIG. 2, from the determined anomaly scores, an ordered list may be generated of user IDs from the first plurality of user IDs based on the respective anomaly scores of each of the first plurality of user IDs such that the user ID with the most anomalous cyber activities is listed first in the ordered list (block 210). In an example, the anomaly scores are essentially reconstruction errors of the autoencoder(s). As noted above, the method 200 does not include assigning anomaly labels (e.g., normal or abnormal) to user IDs, because providing labels without ordering is not really helpful in the context of anomaly detection, which typically has an overwhelming numbers of false-positive cases. It is more helpful for anomaly detection to have an ordered list of users that need to be investigated.

In various aspects, the order of the user IDs in the generated list (e.g., an investigation priority of a user ID) is determined based on the N-th highest rank of the user in different cyber activities (e.g., the more cyber activities in which a user has the greatest anomaly score, the more anomalous the user ID is). For example, if N=2 and a user ID is ranked at 3rd, 5th, 4th respectively for three total cyber activities, then since 4th is the 2nd highest rank (N=2) of this user ID, this user ID has an investigation priority of 4. The generated list may be sorted based on these priorities (the smaller the priority number, the higher the priority). In this example, if the priority of 4 is the highest priority among the user IDs in the list, then this user ID with a priority of 4 has the most anomalous cyber activities and is listed first in the ordered list. Another way to describe Nis to treat N as a number of votes required from each cyber activity for a user ID.

In other aspects, the order of the user IDs in the generated list may be determined using other suitable ordering methods. For example, a suitable ordering method may take into account at least one of whether an anomaly score has an unusual spike, whether an abnormal raise in cyber activity is recent, and whether an abnormal raise in cyber activity demonstrates a particular waveform.

In at least some aspects, the generated ordered list may be displayed (e.g., via display 106). In some aspects, the generated ordered list might not be displayed, but is rather printed with a suitable printer to be viewed as a physical copy. With the generated ordered list, security analysts may decide how many user IDs they want to investigate. For example, security analysts can choose to investigate only the top 1% of the user IDs on the list, or can stop even earlier than the full top 1% if they have checked a certain number of user IDs and found nothing suspicious. In this way, the example method 200 determines anomalous activity of user IDs with a lower false positive rate than typical anomaly detection methods by taking into consideration long-term and group behaviors, and generates information (an ordered list) that helps security analysts quickly and efficiently identify user IDs conducting anomalous activity for further investigation.

EXPERIMENTAL VALIDATION

The inventors validated the example anomaly detection system 100 using a synthesized and labeled dataset that illustrated insider threats. The inventors' results showed that the anomaly detection system 100 outperformed a re-implementation of a prior work. With four abnormal users out of 929 users, the anomaly detection system 100 achieved 99.99% AUC (the area under the ROC curve). As such, the anomaly detection system 100 effectively puts abnormal users on top of the investigation list ahead of normal users.

The inventors implemented the anomaly detection system 100 with Tensorflow 2.0.0. Each fully connected layer was implemented with tensorflow.keras.layers.Dense activated by ReLU. The numbers of hidden units at each layer in the encoder were 512, 256, 128, and 64; the numbers of hidden units in the decoder were 64, 128, 256, and 512. Between layers, batch normalization was implemented with tensorflow.keras.layers.Batch-Normalization. Batch normalization serves the purpose of optimizing the training procedure. To train the model, Adadelta optimizer was used in minimizing Mean-Squared-Error (MSE) loss function. Before feeding compound behavioral deviation matrices, the matrices were flattened into vectors, and the deviations were transformed from close-interval $[-\Delta, \Delta]$ to $[0, 1]$.

The dataset used provided anomaly labels for five predefined threat scenarios. Among them, however, the inventors evaluated the anomaly detection system 100 for the following scenarios: (1) User who did not previously use removable drives or work after hours begins logging in after hours, using a removable drive, and uploading data to Wikileaks.org. Leaves the organization shortly thereafter; and (2) User begins surfing job websites and soliciting employment from a competitor. Before leaving the company, they use a thumb drive (at markedly higher rates than their previous activity) to steal data.

The dataset had two sub-datasets, namely, r6.1 and r6.2. Both r6.1 and r6.2 span from 2010-01-02 to 2011-05-31. Each subset contained one instance of each threat scenario; hence, there were four abnormal users in the four corresponding groups. The inventors defined their groups by their organizational departments (i.e., the third-tier organizational unit) listed in the LDAP logs. There were in total 925 normal users in these four groups. Since the four threat scenarios occur in different times, the inventors selected the training sets and the testing sets for each scenario accordingly; yet, the detection metrics in terms of true positives (TPs), false positives (FPs), and false negatives (FNs) are put together into derivation of $F_1$ scores. For each scenario, the training set included the data from the first collection day until roughly one month before the date of the labeled anomalies, and the testing set included the dates from then until roughly one month after the labeled anomalies. Take r6.1 Scenario 2 as an example, since the anomalies span from 2011 Jan. 7 to 2011 Mar. 7, the training set was built from 2010 Jan. 2 to 2010 Nov. 30, and the testing set from 2010 Dec. 1 to 2011 Mar. 30. The window size ($\omega$) was set to 30 days.

The dataset enclosed a few types of cyber activities, including device accesses, file accesses, HTTP accesses, email accesses, logon-and-logoffs, and LDAP. For presentation purposes, only the logs and features that are strongly related to this evaluation are presented. For each cyber activity, the audit log entries were split by user ID, and then for each user ID a set of behavioral deviations were extracted, each of which represents the number of instances of cyber activity f during the time-frame t on the day d. Feature weights $w_{f,t,d}$ were applied.

Figure 5:
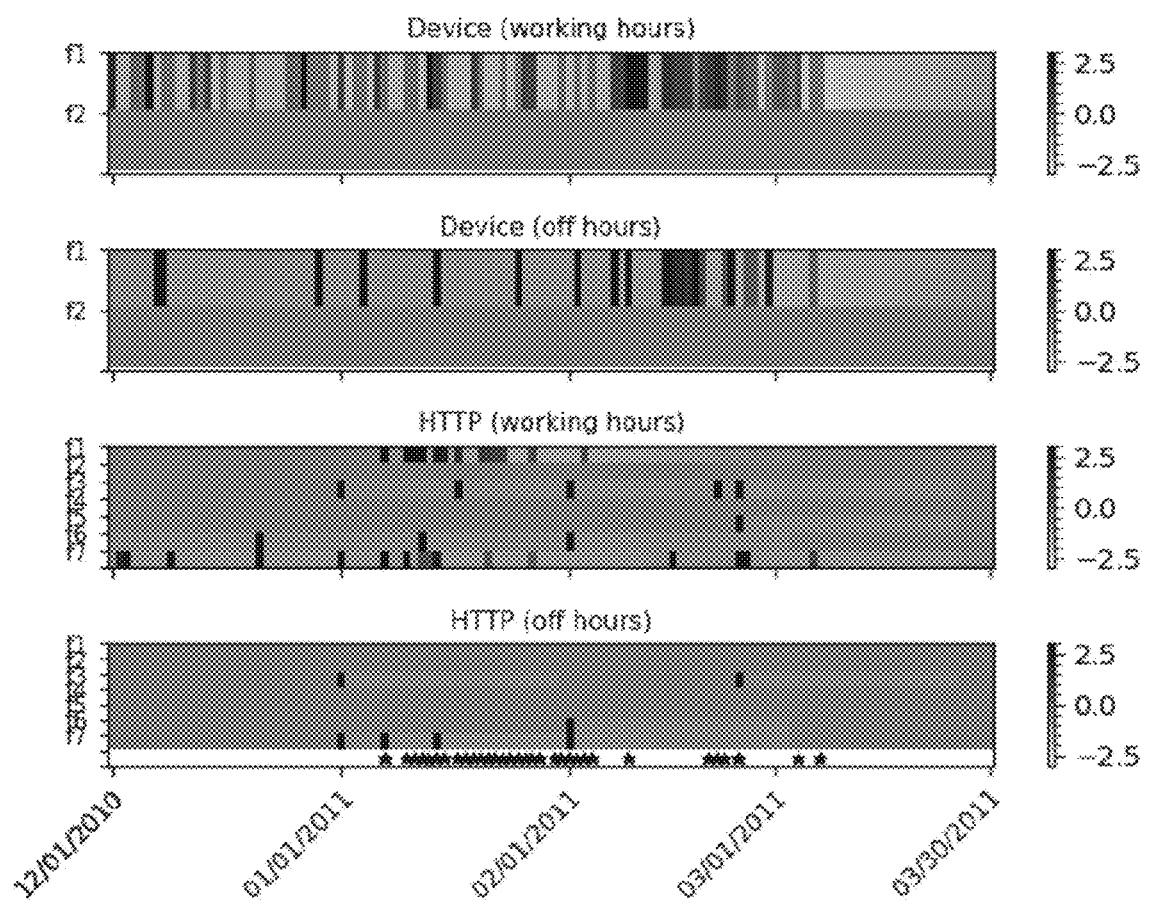
FIG. 5 illustrates behavioral deviation matrices of an abnormal user, according to an aspect of the present disclosure.
Figure 6:
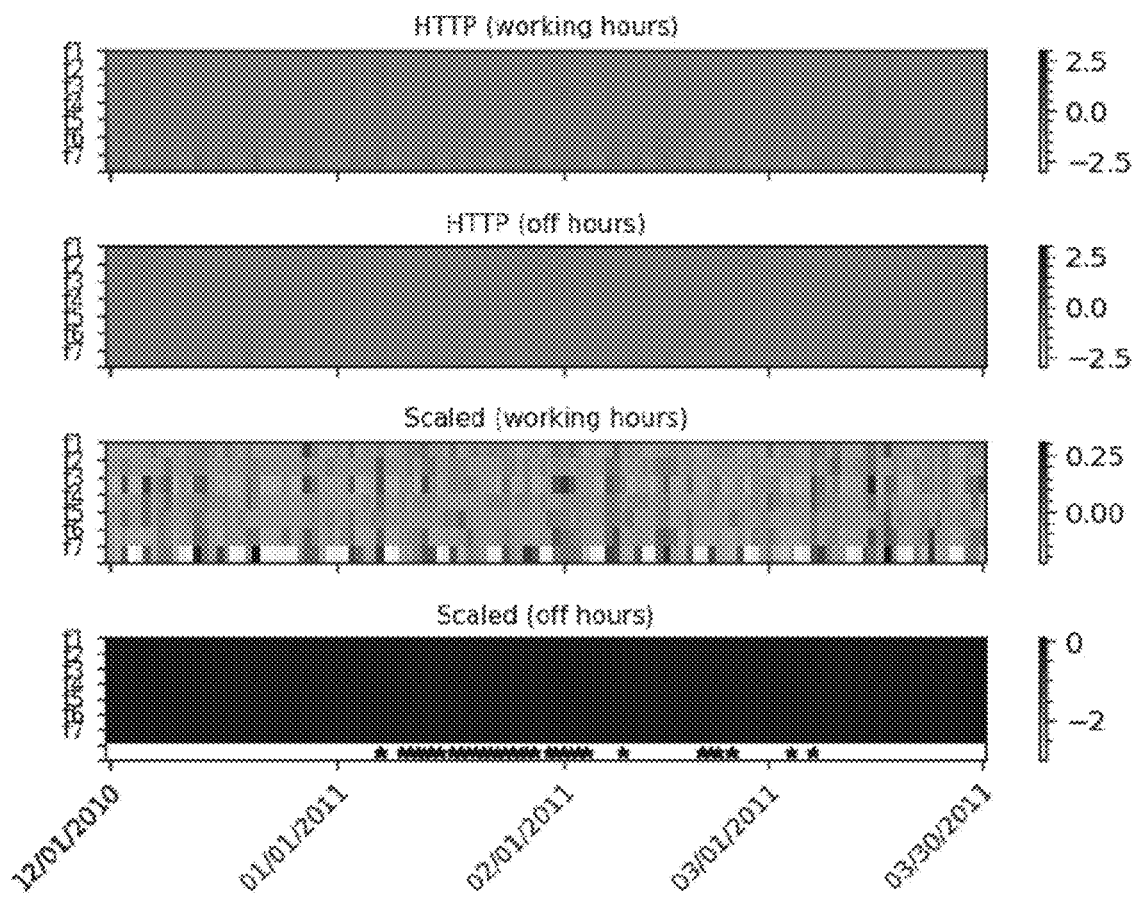
FIG. 6 illustrates behavioral deviation matrices of a group, according to an aspect of the present disclosure.

FIG. 5 illustrates the behavioral deviation matrices of the abnormal user JPH1910. The upper two sub-figures are behavioral deviation in the external storage device cyber activities (with two features), during working hours and off hours, respectively. The lower two sub-figures are behavioral deviation in the web domain access aspect (with seven features), during working hours and off hours, respectively. The star markers at the bottom indicate the labeled anomalous days; however, unlabeled days are not necessarily normal, as identical events were observed being both labeled and unlabeled. Behavioral deviations were in the range $[-\Delta, \Delta]=[-3, 3]$. As shown, in this example, JPH1910 has an abnormal deviation pattern in the HTTP upload-doc (first row) feature starting from January. These deviations are caused by uploading "resume.doc" to several companies, and these events also cause noticeable deviation in the HTTP new-op feature (last row). Dark deviations have white tails, because sliding history window is applied (as they change mean and std that were used in deriving latter deviation. The length of tails hence depends on the window size. For reference, FIG. 6 illustrates the group behavioral deviation in the HTTP aspect with two color scales.

The inventors additionally applied the anomaly detection system 100 to a real-world enterprise data set. A set of audit logs were gathered that spans seven months. Audit logs were generated on Windows servers and web proxies, and they were gathered through the ELK stack. Audit logs from endpoints (e.g., laptops and mobiles) were not included. Windows servers provided logs of the following audit categories: Windows-Event auditing (for application, security, setup, and system events), PowerShell auditing (Microsoft-Windows-PowerShell Operational), System Monitor auditing (Microsoft-Windows-Sysmon Operational), and DNS-query logs. To reduce daily log size, events of noisy and redundant event types were discarded, including Process Access (event ID: 10). Web proxies provide its native system and service logs (including syslog and DHCP logs) and informative proxy logs (where each entry includes user, source, destination, resources, and various types of security verdicts).

Employee accounts were integrated with (have activities from) computer accounts (e.g., alice$), email accounts (e.g., alice@enterprise.com), and domain accounts (e.g., ENT\alice,ENT\alice$, and ENT\alice@enterprise.com). Service accounts (e.g., httpd) and privileged accounts (e.g., admin accounts) were excluded from this case study, because they are not real users (e.g., they do not edit Word documents, check emails, or surf the web pages). These accounts are used occasionally only for particularly privileged operations, and thus they do not demonstrate habitual patterns like humans do. As such, there were 246 employees in the data set.

By applying Sigma signatures, there were no attacks in the gathered audit logs. To work with this dataset, the following two attacks were launched in the same environment under control, and the aftermath attack logs were embedded into the enterprise dataset. The attack logs were embedded into the log of a specific user on specific days, whereas the logs of the users and the other days were intact. The first attack was a Zeus Botnet attack. Malicious activities included downloading Zeus from a downloader app, deleting this downloader app, and modifying registry values. The Zeus bot also made queries to non-existing domains. The second attack was a ransomware attack. Malicious activities included modifying registry values and encrypting files.

Predictable aspects are aspects where dependency or causality exists among consecutive events, so that upcoming events may be predicted based on a sequence of events. For example, it may be predicted that a user will read a particular file after gaining a particular file-access permission, or that a user will execute a particular command after one another (e.g., dir followed by ls). To measure how an event sequence deviates from a user's habitual pattern with predictable context, a deep learning based anomaly detection model can be leveraged for discrete events. Two (out of four) predictable aspects for this dataset are presented: File accesses such as file-handle operations, file shares, and Sysmon file-related events (event IDs: 2, 11, 4656, 4658-4663, 4670, 5140-5145), and Command executions such as process creation and PowerShell execution (1, 4100-4104, 4688). For simplicity, only the following three features are presented for the File behavioral aspect and for the Command behavioral aspect: (1) f1: the number of events during a period; (2) f2: the number of unique events during a period; and (3) f3: the number of new events during a period.

Statistical aspects are aspects where upcoming events cannot be predicted, or aspects that have better solutions for extracting deviation than prediction. To measure behavioral deviation without predictable context, features can be leveraged that describe a statistically structural pattern in a large-scale enterprise. With observation that each employee has structural access from enterprise account to network resources (e.g., workday portal, cloud drive, social media), one (out of two) statistical behavioral aspect is presented: HTTP traffic. For simplicity, only the following four features are presented: (1) f1: a quantity of successful requests during a period; (2) f2: a quantity of successful requests to a new domain during the period; (3) f3: a quantity of failure requests during the period; and (4) a quantity of failure requests to a new domain during the period.

The inventors showed how malicious activities impact the victim's behavioral matrix and anomaly scores (with N=3) in the two cyber attack scenario. There were 246 employees, and one of which is under the aforementioned two attacks on February 2nd. There were in total 27 behavioral features, 16 of which from four behavioral aspects (namely, File, Command, Config, and Resource) and 11 from statistical aspects (namely HTTP and Logon). The window size for our compound behavioral deviation matrix was two weeks (14 days). This dataset spanned seven months, including six months of training set and one month of testing set.

Figure 7A:
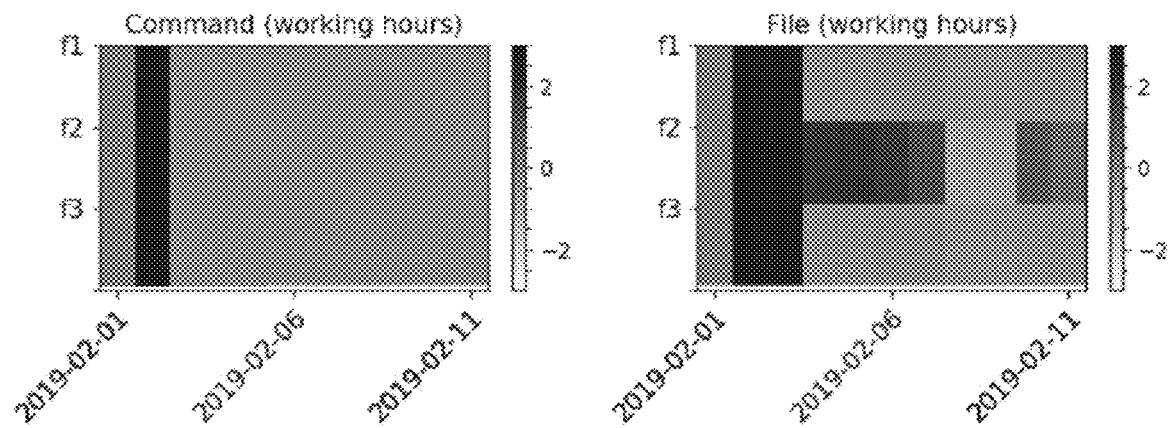
FIGS. 7A and 7B illustrate partial compound behavioral deviation matrices of a victim of an attack, according to an aspect of the present disclosure.
Figure 7B:
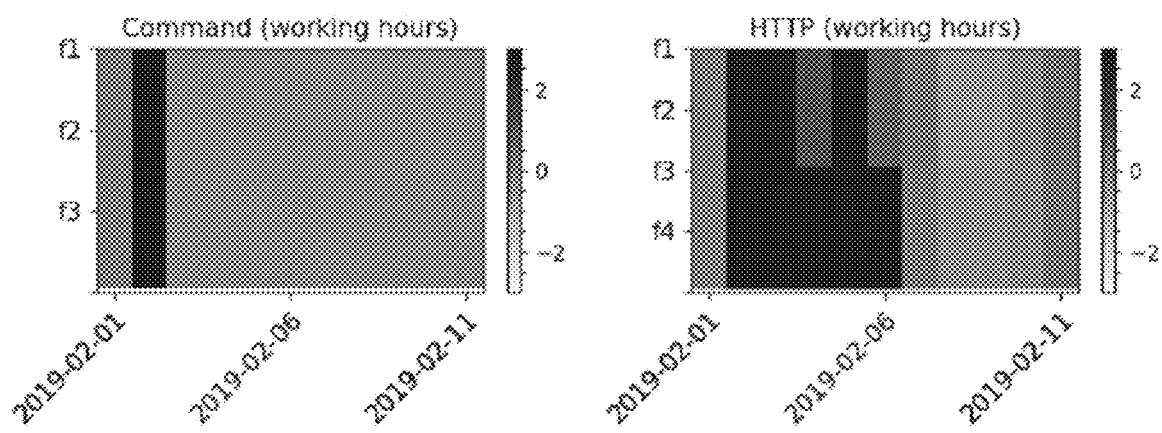

FIGS. 7A and 7B illustrate the victim's partial compound behavioral deviation matrices. In both attack scenarios, positive deviations are seen in the Command aspect. These deviations were caused by the newly observed executions of the malware programs. Such executions increase the number of events (i.e., f1 increases), the number of unique events (i.e., f2 increases), and the number of new events (i.e., f3 increases). Since the victim barely has any activities in the Command aspect, such deviations are significant (hence, they are dark). Though not illustrated, the same positive deviation in the Config aspect was seen, as two attacks both modified registry values shortly after being triggered. In the ransomware scenario, deviations in the File aspect were caused by newly observed read, write, and delete operations conducted by the malware (note that, these operations are no longer new after one day). In the botnet scenario, deviations in the HTTP aspect were caused by successful connections to the command and control server and failure connections to the newGOZ domains.

Figure 8A:
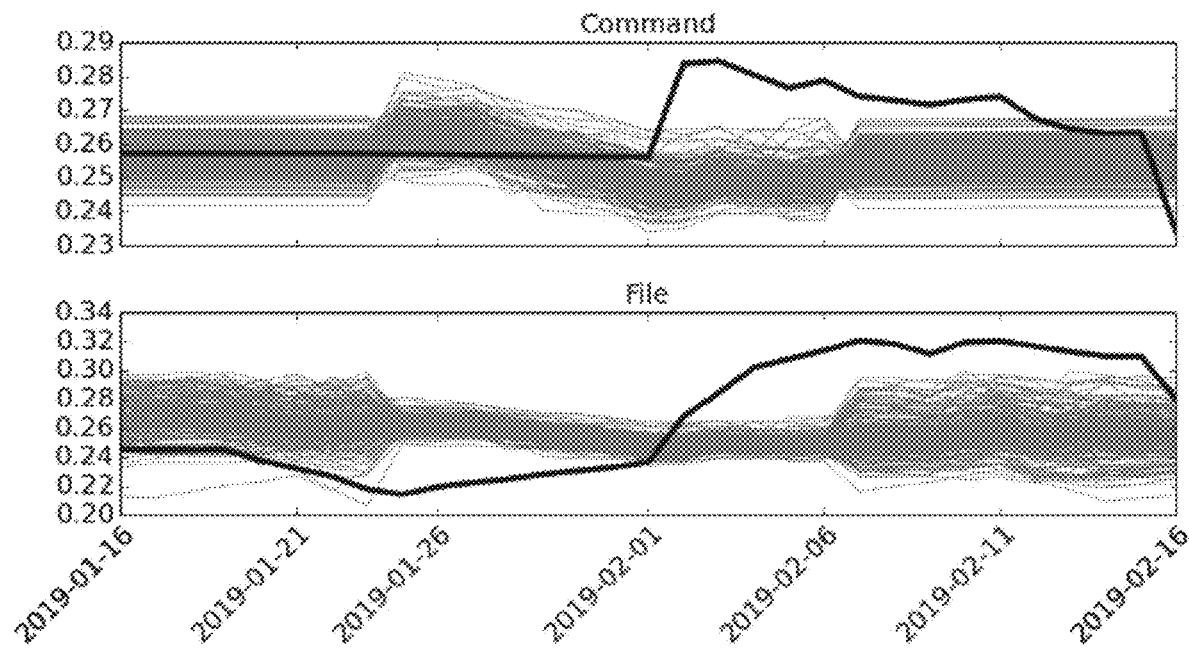
FIGS. 8A and 8B illustrate example graphs showing how a cyber activity can affect the anomaly scores, according to an aspect of the present disclosure.
Figure 8B:
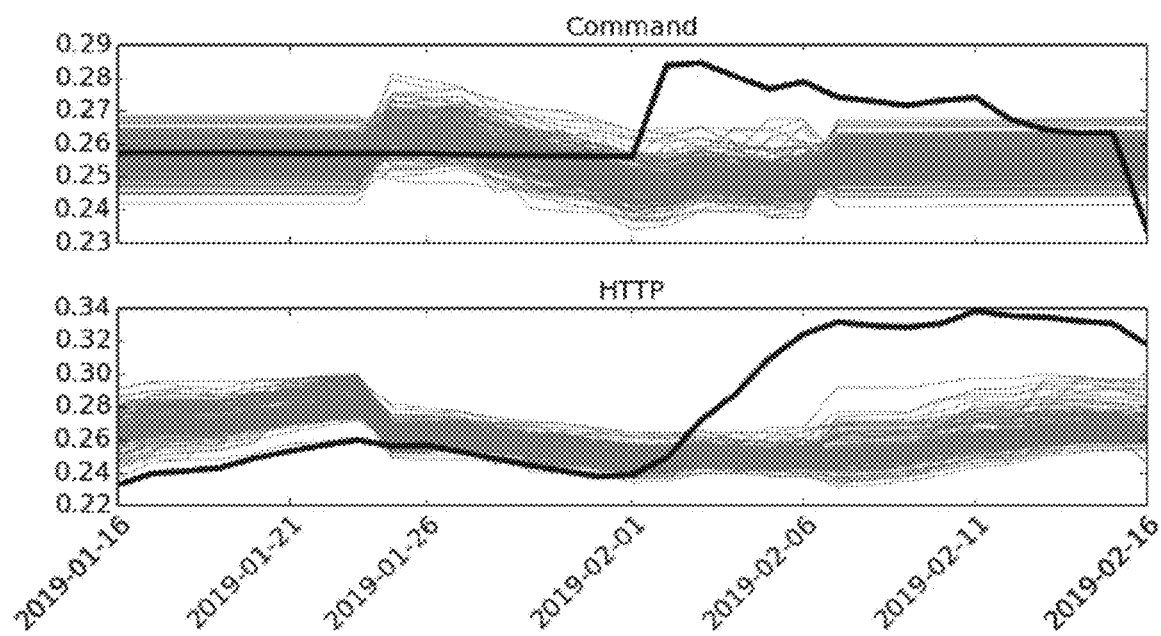

FIGS. 8A and 8B illustrate example graphs showing how each cyber activity affects the anomaly scores. One aspect is considered per each subfigure. As shown, the waveforms have significant rises after the attack day (i.e., February 2nd). Considering all aspects together, the victim is ranked at 1st place in the generated list of the anomaly detection system 100 from February 3rd to February 15th with both ransomware and botnet malware. Security analysts can easily find the attacks starting from the generated list if periodic investigation is enforced. In addition, the inventors observed the following. First, normal users together demonstrate a main stream of score trends. It can be seen that normal users have rises in Command and drops in HTTP on January 26th due to an environmental change. This again indicates that it is important to examine behavioral correlation between an individual and its group. Second, although the attack day is on February 2nd, the waveforms of File and HTTP do not demonstrate immediate and significant rise for the victim. This indicates that the widely used single-day detection methodology may not be able to identify the attacks. In contrast, with long-term deviation pattern embedded in behavioral matrices, the waveforms rise after the attack day. Accordingly, the inventors have shown that long-term signals and group correlations are effective in signaling abnormal users.

Without further elaboration, it is believed that one skilled in the art can use the preceding description to utilize the claimed inventions to their fullest extent. The examples and aspects disclosed herein are to be construed as merely illustrative and not a limitation of the scope of the present disclosure in any way. It will be apparent to those having skill in the art that changes may be made to the details of the above-described examples without departing from the underlying principles discussed. In other words, various modifications and improvements of the examples specifically disclosed in the description above are within the scope of the appended claims. For instance, any suitable combination of features of the various examples described is contemplated.

The invention is claimed as follows:

1. A system for detecting anomalous cyber activity comprising: a memory; and a processor in communication with the memory, the processor configured to:

receive information on each of a plurality of cyber activities for each of a first plurality of user IDs, wherein the information is selected from: (1) a quantity of files locally opened by the respective user ID that the respective user ID had never locally opened before, (2) a quantity of files remotely opened by the respective user ID that the respective user ID had never remotely opened before, (3) a quantity of files written locally by the respective user ID that the respective user ID had never written locally before, (4) a quantity of files written remotely by the respective user ID that the respective user ID had never written remotely before, (5) a quantity of local files copied to a remote device that the respective user ID had never copied to a remote device before, and (6) a quantity of remote files copied to a local device that the respective user ID had never copied to a local device before;

determine, for each of the plurality of cyber activities of each of the first plurality of user IDs, a first deviation between the received information on a respective cyber activity for a respective user ID and previously stored information on the respective cyber activity for the respective user ID;

determine, for each of the plurality of cyber activities of each of the first plurality of user IDs, a second deviation between the received information on the respective cyber activity for the respective user ID and previously stored group information on the respective cyber activity for a group including a second plurality of user IDs;

determine, using at least one autoencoder, an anomaly score for each of the plurality of cyber activities of each of the first plurality of user IDs based on the determined first and second deviations for a respective cyber activity of a respective user ID; and generate an ordered list of user IDs from the first plurality of user IDs based on the respective anomaly scores of each of the first plurality of user IDs such that the user ID with the most anomalous cyber activities is listed first in the ordered list.

2. The system of claim 1, wherein the received information on each respective cyber activity for each respective user ID includes information on the respective cyber activity for the respective user ID over a first timeframe and information on the respective cyber activity for the respective user ID over a second timeframe.

3. The system of claim 2, wherein the first timeframe corresponds to working hours of the first plurality of user IDs, and
wherein the second timeframe corresponds to non-working hours of the first plurality of user IDs.

4. The system of claim 2, wherein the first and second timeframes are each less than twenty-four hours, and
wherein the received information on each respective cyber activity for each respective user ID includes the information over the first and second timeframes for a period of one or more days.

5. The system of claim 3, wherein the period is equal to multiple days.

6. The system of claim 1, wherein the previously stored group information for a respective cyber activity is an average of information on the respective cyber activity for each user ID in the group.

7. The system of claim 1, wherein the first deviation D1 for a respective cyber activity of a respective user ID is calculated according to the below equations:

$$D1 = \sigma_{1,t,d} + \sigma_{2,t,d} \ldots + \sigma_{f,t,d}$$

$$\sigma_{f,t,d} = \begin{cases} \Delta, \text{ if } \delta_{f,t,d} \geq \Delta \\ -\Delta, \text{ if } \delta_{f,t,d} \leq -\Delta \\ \delta_{f,t,d}, \text{ otherwise} \end{cases}$$

$$\delta_{f,t,d} = \frac{m_{f,t,d} - \text{mean}(\vec{h}_{f,t,d})}{std(\vec{h}_{f,t,d})}$$

wherein of,t,$_d$ is a sigma for a respective user ID of a cyber activity f in a timeframe t, on a day d, 8f,t,$_d$ is a variance for a respective user ID of a cyber activity f in a timeframe t, on a day d, mf,t,$_d$ is numeric measurements for the respective user ID of the cyber activity f in the timeframe t, on the day d, mean(hf,t,$_d$) is a mean of hf,t,$_d$, wherein hf,t,$_d$ is a vector of the previously stored information for the respective user ID of the cyber activity f in the timeframe t, on the day d, and std(hf,t,$_d$) is a standard deviation of hf,t,$_d$.

8. The system of claim 7, wherein the sigma of each respective cyber activity of a respective user ID is weighted with a weight, when determining the first deviation DI, according to the below equations:

$$D1 = \omega_{1,t,d}\sigma_{1,t,d} + \omega_{2,t,d}\sigma_{2,t,d} \ldots + \omega_{f,t,d}\sigma_{f,t,d}$$

$$w_{f,t,d} = \frac{1}{\log_2\left(\max\left(std(\vec{h}_{f,t,d}), 2\right)\right)}$$

wherein wf,t,$_d$ is a weight of a cyber activity f in a timeframe t, on a day d, and std(hf,t,$_d$) is a mean of hf,t,$_d$, wherein hf,t,$_d$ is a vector of the previously stored information of the cyber activity f in the timeframe t, on the day d.

9. The system of claim 1, wherein the second deviation D2 for a respective cyber activity of a respective user ID is calculated according to the below equation:

$$D2 = \sigma_{1,t,d} + \sigma_{2,t,d} \ldots + \sigma_{f,t,d}$$

$$\sigma_{f,t,d} = \begin{cases} \Delta, \text{ if } \delta_{f,t,d} \geq \Delta \\ -\Delta, \text{ if } \delta_{f,t,d} \leq -\Delta \\ \delta_{f,t,d}, \text{ otherwise} \end{cases}$$

$$\delta_{f,t,d} = \frac{m_{f,t,d} - \text{mean}(\vec{g}_{f,t,d})}{std(\vec{g}_{f,t,d})}$$

wherein of,t,$_d$ is a sigma for a respective user ID of a cyber activity f in a timeframe t, on a day d, $^6$f,t,$_d$ is a variance for a respective user ID of a cyber activity f in a timeframe t, on a day d, mf,t,$_d$ is numeric measurements for the respective user ID of the cyber activity f in the timeframe t, on the day d, mean(ft,$_d$) is a mean of $^4$ftd, wherein gf,t,$_d$ is a vector of the previously stored information on the group for the cyber activity f in the timeframe t, on the day d, and std('ft,$_d$) is a standard deviation of 'ft,$_d$.

10. The system of claim 1, wherein the information on a respective cyber activity for a respective user ID includes: (1) a quantity of connections of an external storage device by the respective user ID to a device in communication with the processor, and (2) a quantity of connections of an external storage device by the respective user ID to a device that the respective user ID had never connected to before.

11. The system of claim 1, wherein the information on a respective cyber activity for a respective user ID includes a quantity of file uploads to a domain address that the respective user ID had never before uploaded to the domain address.

12. A method for detecting anomalous cyber activity comprising:
- receiving information on each of a plurality of cyber activities for each of a first plurality of user IDs, wherein the information is selected from: (1) a quantity of files locally opened by the respective user ID that the respective user ID had never locally opened before, (2) a quantity of files remotely opened by the respective user ID that the respective user ID had never remotely opened before, (3) a quantity of files written locally by the respective user ID that the respective user ID had never written locally before, (4) a quantity of files written remotely by the respective user ID that the respective user ID had never written remotely before, (5) a quantity of local files copied to a remote device that the respective user ID had never copied to a remote device before, and (6) a quantity of remote files copied to a local device that the respective user ID had never copied to a local device before;
- determining, for each of the plurality of cyber activities of each of the first plurality of user IDs, a first deviation between the received information on a respective cyber activity for a respective user ID and previously stored information on the respective cyber activity for the respective user ID;
- determining, for each of the plurality of cyber activities of each of the first plurality of user IDs, a second deviation between the received information on the respective cyber activity for the respective user ID and previously stored group information on the respective cyber activity for a group including a second plurality of user IDs;
- determining, using at least one autoencoder, an anomaly score for each of the plurality of cyber activities of each of the first plurality of user IDs based on the determined first and second deviations for a respective cyber activity of a respective user ID; and
- generating an ordered list of user IDs from the first plurality of user IDs based on the respective anomaly scores of each of the first plurality of user IDs such that the user ID with the most anomalous cyber activities is listed first in the ordered list.

13. The system of claim 12, wherein the information on a respective cyber activity for a respective user ID includes: (1) a quantity of document file uploads to a domain address that the respective user ID had never before uploaded to the domain address, (2) a quantity of .exe file uploads to a domain address that the respective user ID had never before uploaded to the domain address, (3) a quantity of .jpg file uploads to a domain address that the respective user ID had never before uploaded to the domain address, (4) a quantity of .pdf file uploads to a domain address that the respective user ID had never before uploaded to the domain address, (5) a quantity of .txt file uploads to a domain address that the respective user ID had never before uploaded to the domain address, (6) a quantity of .zip file uploads to a domain address that the respective user ID had never before uploaded to the domain address, and (7) a quantity of new http requests that the respective user ID had never before requested.

14. The method of claim 12, wherein the ordered list is generated based on the N-th highest rank of the respective user IDs in each of the plurality of cyber activities.

15. The method of claim 12, wherein the first plurality of user IDs include the second plurality of user IDs.

16. The method of claim 12, wherein the first plurality of user IDs consist of the second plurality of user IDs.

17. The method of claim 12, further comprising displaying the generated ordered list on a display.

18. A non-transitory, computer-readable medium storing instructions, which when executed by a processor, cause the processor to:
- receive information on each of a plurality of cyber activities for each of a first plurality of user IDs, wherein the information is selected from: (1) a quantity of files locally opened by the respective user ID that the respective user ID had never locally opened before, (2) a quantity of files remotely opened by the respective user ID that the respective user ID had never remotely opened before, (3) a quantity of files written locally by the respective user ID that the respective user ID had never written locally before, (4) a quantity of files written remotely by the respective user ID that the respective user ID had never written remotely before, (5) a quantity of local files copied to a remote device that the respective user ID had never copied to a remote device before, and (6) a quantity of remote files copied to a local device that the respective user ID had never copied to a local device before;
- determine, for each of the plurality of cyber activities of each of the first plurality of user IDs, a first deviation between the received information on a respective cyber activity for a respective user ID and previously stored information on the respective cyber activity for the respective user ID;
- determine, for each of the plurality of cyber activities of each of the first plurality of user IDs, a second deviation between the received information on the respective cyber activity for the respective user ID and previously stored group information on the respective cyber activity for a group including a second plurality of user IDs;
- determine, using at least one autoencoder, an anomaly score for each of the plurality of cyber activities of each of the first plurality of user IDs based on the determined first and second deviations for a respective cyber activity of a respective user ID; and
- generate an ordered list of user IDs from the first plurality of user IDs based on the respective anomaly scores of each of the first plurality of user IDs such that the user ID with the most anomalous cyber activities is listed first in the ordered list.

19. The non-transitory, computer-readable medium of claim 18, wherein the information on a respective cyber activity for a respective user ID includes information on connections of an external storage device by the respective user ID to a device in communication with the processor, information on files accessed by the respective user ID, and information on files uploaded by the respective user ID to a domain address.

* * * * *